No. 798,599. PATENTED SEPT. 5, 1905.
W. F. CONRAD.
CEMENT BRICK MAKING MACHINE.
APPLICATION FILED SEPT. 17, 1904.

2 SHEETS—SHEET 2.

Witnesses
Frank A. Fahle
J. A. Walsh

Inventor
Winburn F. Conrad

By Bradford Hood
Attorneys

UNITED STATES PATENT OFFICE.

WINBURN F. CONRAD, OF INDIANAPOLIS, INDIANA, ASSIGNOR OF ONE-HALF TO CHARLES A. OWEN, OF INDIANAPOLIS, INDIANA.

CEMENT-BRICK-MAKING MACHINE.

No. 798,599.      Specification of Letters Patent.      Patented Sept. 5, 1905.

Application filed September 17, 1904. Serial No. 224,891.

*To all whom it may concern:*

Be it known that I, WINBURN F. CONRAD, a citizen of the United States, residing at Indianapolis, in the county of Marion and State of Indiana, have invented certain new and useful Improvements in Cement-Brick-Making Machines, of which the following is a specification.

It has been customary heretofore to manufacture building blocks and brick from a mixture of sand and hydraulic cement, but, so far as I am aware, the only successful apparatus for producing such bricks or blocks have been largely hand-operated and not automatic.

The object of my invention is to produce a machine capable of automatically producing in large numbers bricks or blocks of cement mixture; and the fundamental feature of my invention consists in providing means by which the brick and molds may be separated without material pressure upon the brick at the time of separation, thus preventing crumbling of the corners, as is the case where an attempt is made to push a formed brick from a mold.

The accompanying drawings illustrate my invention.

Figure 1:
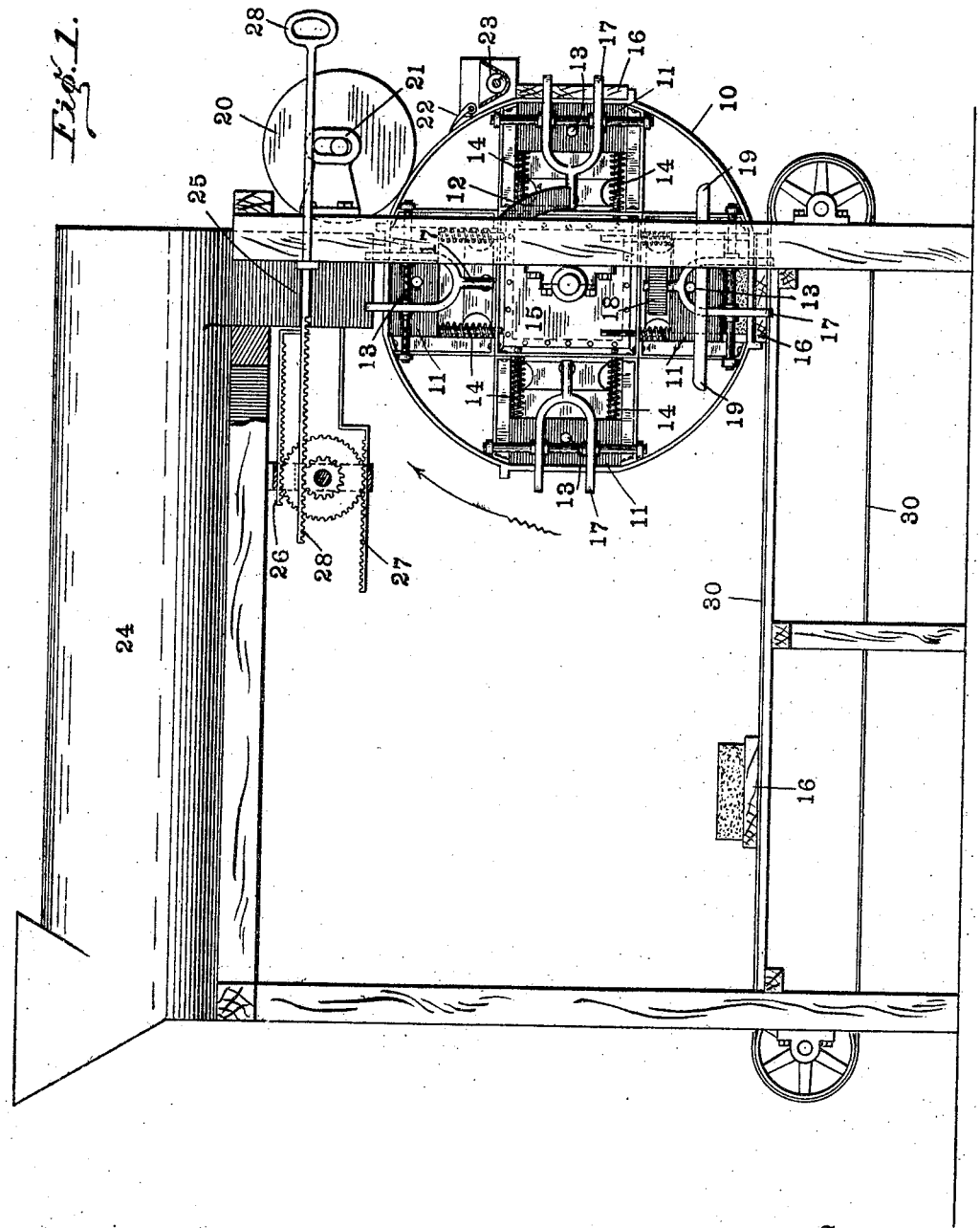
Figure 2:
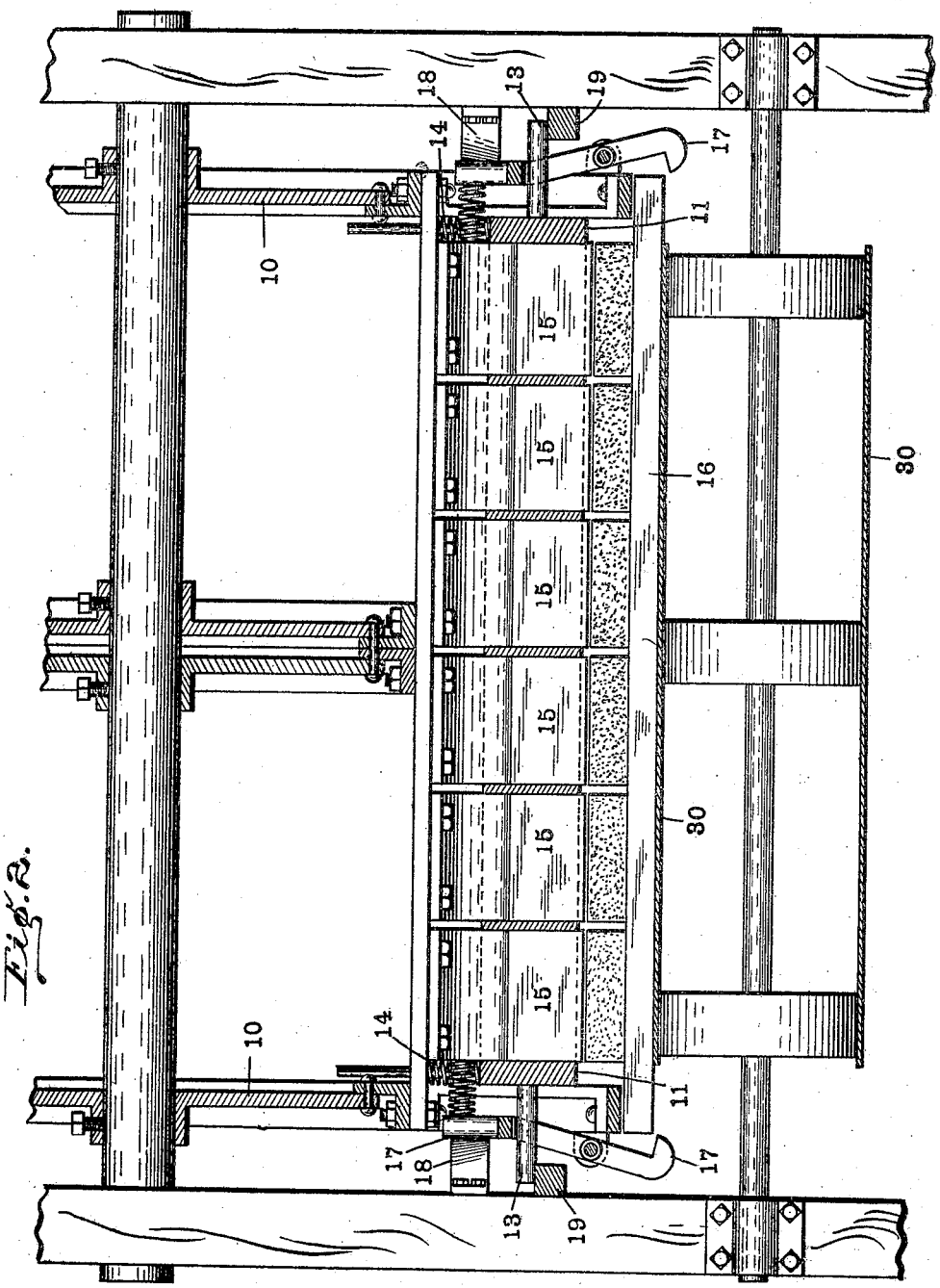

Figure 1 is a side elevation of a machine embodying my invention; Fig. 2, a transverse section, on a larger scale, of a mold and associated parts.

In the drawings, 10 indicates a revolving drum-like structure which carries a plurality of the molding mechanisms. This drum may be of any desired construction and provided with as many molding mechanisms as may be found to be convenient or desirable. Each molding mechanism consists of a radially-movable mold 11, divided into compartments, each having a cross-section like the cross-section of a brick or block to be molded and of a depth considerably greater than the thickness of the desired bricks or blocks. The mold 11, as stated, is movable radially with relation to the drum, and in order to provide for such movement each mold is provided with extensions 13, the purpose of which will appear, and each mold is normally urged outward to its outermost position by means of suitable springs 14. Associated with each mold 11 is a plurality of abutments 15, each of which fits snugly within one of the compartments of the mold and projects thereinto a distance such that when the mold is extended to its outer or normal position there remains of the compartment, at its outer end, a space sufficient in which to form the desired brick or block.

In the outermost position of each mold its outer face or end is preferably flush with the periphery of the drum, which at that point is flattened in order to receive a pallet-board 16. The pallets 16 are held in position by means of suitable hooks 17, pivoted adjacent each mold at the opposite ends thereof on the revolving drum, and each of these hooks on each side is adapted to be engaged by one of a pair of cams 18, carried by the main frame in position to engage the hooks adjacent any mold when that mold has been carried to the lowest position of the drum. The distance between the pallet and the outer ends of the abutments 15 remains constant at all times. Adjacent the cams 18 are cams 19, adapted to engage the extensions 13 of the molds 11 in succession and push said molds inward against the action of springs 14.

Arranged adjacent the periphery of the drum, preferably near the top thereof, is a pressure-roller 20, vertically movable in suitable bearings 21, carried by the main frame, the arrangement being such that the pressure-roller will be rotated by the main drum and will exert its weight upon any material placed in the molds in order to compact the same. Arranged just below the pressure-roller 20 and adapted to engage the periphery of the drum 10 is a scraper-plate 22, adapted to remove any surplus of material from the molds and discharge the same into a trough 23, from which the surplus material may be returned to the supply. The molds may be filled by hand, if desired; but I prefer to arrange an automatic mixing-machine 24 of any desired type above the machine just described. The details of this mixing-machine have not been shown.

The mixer 24 discharges into a substantially vertical spout 25, which leads downward to the drum in position to discharge into any set of molds when the same is presented uppermost. The point of discharge of the spout 25 is substantially in the crotch between the drum and the pressure-roller 20, and said spout is provided with a pair of oppositely-operating valves 26 and 27, connected in the usual manner to a single operating-lever 28, the arrangement being such that by shifting the operating-lever 28 a desired and measured quantity of material may be allowed to pass from the mixer to the molds. Arranged beneath the drum at the point of discharge of the pallets and finished brick is any suitable means for receiving said loaded pallets, in the drawings said receiving means being shown as an endless carrier 30.

In operation with the parts shown in position in Fig. 1 a complete reciprocation of the lever 28 will cause a measured quantity of material to pass down through spout 25 and be deposited in the pockets of the uppermost set of molds 11. The drum is then rotated in the direction indicated by the arrow, and the pressure-roller 20 compacts the material in the molds against the outer ends of the abutment 15. As the drum advances scraper 22 removes all surplus material and discharges the same into the trough 23, and when the filled mold has passed beyond the scraper an attendant applies a pallet 16, the spring-pressed catches 17 being momentarily retracted to permit such application by cams, the catches 17 serving to hold the pallet in position. At this time a fresh mold is preferably in receiving position. As the drum continues to rotate the extensions 13 of the filled mold come into engagement with the cams 19, and continued rotation of the drum serves to gradually retract the mold from the brick, the brick being in the meantime firmly supported between the outer ends of the abutments 15 and the pallet, no material pressure being exerted upon the brick. As a consequence there is no tendency to crush at the corners, and the formed brick comes from the mold with sharp well-defined edges. So soon as the mold 11 has been withdrawn or nearly withdrawn from the brick the catches 17 are engaged by the cams 18, and the loaded pallet drops a very short distance upon the endless carrier 30.

I claim as my invention—

1. In a cement-brick-forming machine, a plurality of independent molds, a plurality of abutments fitting one within each of said molds and forming one end thereof, a removable pallet at the opposite end of each mold, means for temporarily holding a pallet opposite the open end of each mold, means for stripping each mold over its abutment while the pallet is maintained at a constant distance from the abutment, means for releasing the pallet with its accompanying bricks, and means for bringing the molds successively to filling and stripping positions.

2. In a cement-brick-forming machine, the combination of a rotatable drum, a plurality of open-ended molds carried thereby and movable radially therein, a plurality of abutments fitting, one in each of said molds, and forming a closure for the inner end thereof, means for securing a pallet adjacent each of said molds in position to form a closure for the outer end of the mold, and means for retracting the mold over its abutment, whereby the mold may be stripped from the brick.

3. In a cement-brick-forming machine, the combination of a rotatable drum, a plurality of open-ended molds carried thereby and movable radially therein, a plurality of abutments fitting one in each of said molds and forming a closure for the inner end thereof, means for securing a pallet adjacent each of said molds in position to form a closure for the outer end of the mold, means for retracting the mold over its abutment whereby the mold may be stripped from the brick, a pressure-roller arranged adjacent the drum in position to exert pressure upon a freshly-filled mold.

In witness whereof I have hereunto set my hand and seal at Indianapolis, Indiana, this 10th day of September, A. D. 1904.

WINBURN F. CONRAD. [L. S.]

Witnesses:
CHESTER BRADFORD,
JAMES A. WALSH.